United States Patent [19]

Hart

[11] Patent Number: 5,001,596

[45] Date of Patent: Mar. 19, 1991

[54] CAPACITIVE FLUID LEVEL SENSOR

[75] Inventor: John R. Hart, Lexington, Ohio

[73] Assignee: Therm-O-Disc, Incorporated, Mansfield, Ohio

[21] Appl. No.: 519,732

[22] Filed: May 7, 1990

[51] Int. Cl.$^5$ .................. G01F 23/26; H01G 7/00
[52] U.S. Cl. .................. 361/284; 29/25.42; 73/304 C
[58] Field of Search .............. 361/284; 73/304 C; 340/620; 29/25.42

[56] References Cited

U.S. PATENT DOCUMENTS

| | | | |
|---|---|---|---|
| 2,700,901 | 2/1955 | Rickner | 73/304 C |
| 2,950,426 | 8/1960 | Frome | 361/284 |
| 2,998,559 | 8/1961 | Smith | 73/304 C |
| 4,295,370 | 10/1981 | Bristol | 73/304 C |

Primary Examiner—Donald A. Griffin
Attorney, Agent, or Firm—Jones, Day, Reavis & Pogue

[57] ABSTRACT

A capacitor for a fluid level sensor that has first and second elongated expandable capacitor plates mounted in spaced relationship with respect to each other in a container to form a capacitor for measuring data representing the liquid in the container, the capacitor plates being continuously expandable from a first length to a second length with a given change in the shape of the container. Thus, the capacitor compensates for the change in container shape.

34 Claims, 2 Drawing Sheets

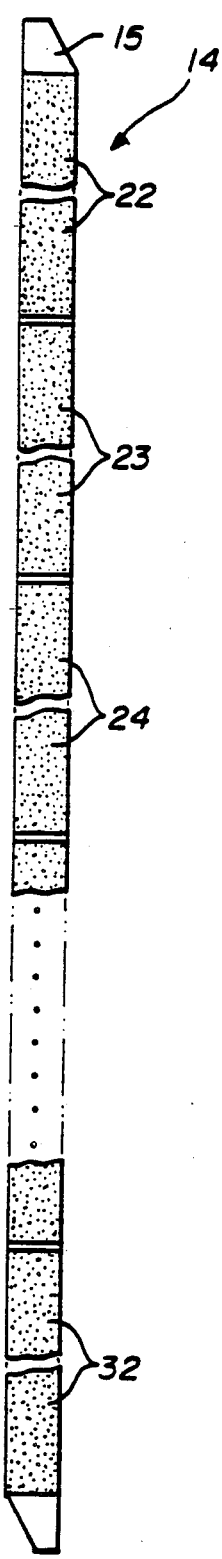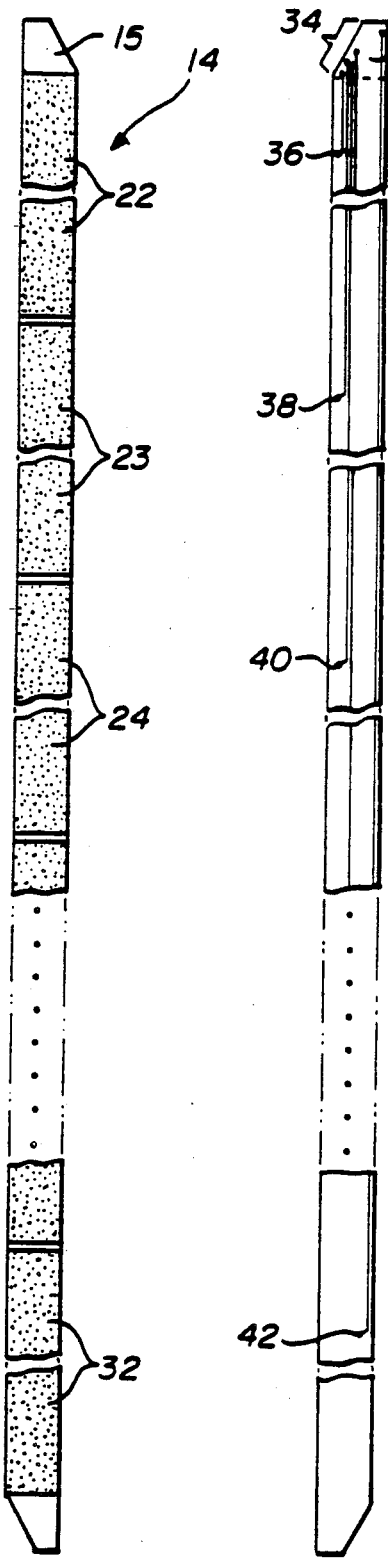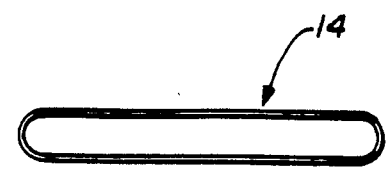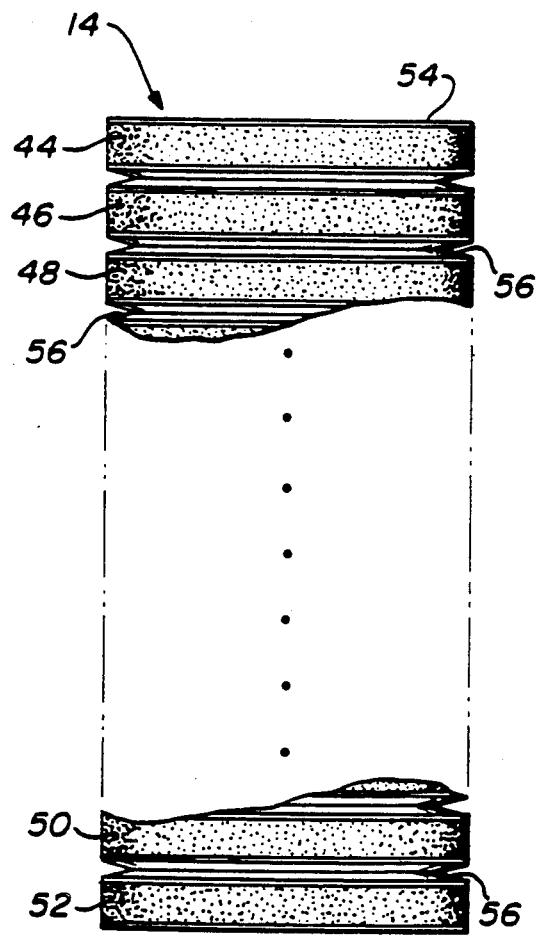
FIG. 3      FIG. 4
FIG. 5B
FIG. 5A

CAPACITIVE FLUID LEVEL SENSOR

FIELD OF THE INVENTION

The invention relates in general to fluid level sensors and in particular to a capacitive fluid level sensor that expands and contracts with the tank height/volume to maintain an accurate measure of the quantity of the fluid or a fluid level in the container.

BACKGROUND OF THE INVENTION

Fluid level sensors that use capacitors for the primary sensing elements are well known. However, prior devices have numerous drawbacks which result in either excessive cost, decreased accuracy or poor reliability and maintainability over extended periods of use. For example, ring plate capacitor devices are difficult, and hence costly, to manufacture. Detectors that use separate electronic circuits for each capacitor or group of capacitors require time-consuming and labor-intensive calibrations. RF circuits require extensive and precision components that introduce a much greater likelihood that one of those circuits will drift with age. Also, multi-circuit detectors must be reconfigured for each tank or container design. Further, it is well known that tanks or containers change their shape when filled with fluid as compared with their empty state; thus, a tank may have a depth of approximately 7 inches in its near empty state but may expand to a depth of 11 inches when it is filled with a liquid. No known devices exist which compensate for the expansion and contraction of the tank with the volume of liquid it contains. Thus, with a fixed fluid level sensor in the tank, the expansion and contraction introduces an error in the calculation of fluid depth in the tank.

The need, therefore, has long existed for an accurate yet inexpensive apparatus for detecting the level or quantity of fluid in a container and in particular a container which changes shape with the quantity of liquid it contains.

SUMMARY OF THE INVENTION

The present invention overcomes the noted drawbacks of the prior art devices by providing a fluid level sensor that uses a capacitive probe that is economical to manufacture, yet accurate in its measurements. The normal sensor comprises first and second elongated expandable capacitor plates mounted in spaced relationship with respect to each other in a container to form a capacitor for measuring data representing the liquid in the container, the capacitor plates being continuously expandable from a first length to a second length with a given change in shape of the container to compensate for the change in a container shape. The capacitance of the expandable plates varies with the fluid and air dielectric and generates the data representing the liquid in the container. The capacitor plates may have a generally cylindrical tubular shape and the cylindrical tubular shape may be in the form of a generally ovate shape.

In the preferred embodiment, one of the plates is formed of two overlapping sections, one slidable within the other to expand or contract in length.

Also, in the preferred embodiment, the other capacitor plate is formed of a spring material in an ovate, helical shape for expansion and contraction within the first ovate capacitor plate. Further, in the preferred embodiment a plurality of capacitor plates are formed on the spring material in spaced relationship so as to create a plurality of individual capacitors in conjunction with the first capacitor plate.

In an alternate embodiment, the second capacitor plate is formed of a bellows for expansion and contraction within the first tubular capacitor plate. The bellows is formed of a non-conductive spring material having spaced areas thereon and conductive platinum material is plated on the spaced areas to form a plurality of spaced capacitor plates separated by non-conductive areas.

The invention also relates to a method of forming a fluid level sensor that measures data that accurately represents a fluid in a container comprising the steps of forming a first capacitor plate expandable in length, forming a second capacitor plate expandable in length and in spaced relationship to the first plate to form a variable capacitor, attaching both ends of one of the capacitor plates to the top and bottom of the container changing the size of the variable capacitor plate with change in tank size and coupling both ends of the other capacitor plate to the top and bottom of the container respectively such that variable capacitor compensates for a change in the size of the container when it is filled with fluid.

BRIEF DESCRIPTION OF THE DRAWINGS

These and other aspects of the invention will be more fully explained and readily appreciated from reading the detailed description that follows, in view of the accompanying drawings in which like numbers represent like elements and in which:

FIG. 3 is a partial side view of the spring material that is used to form the ovate helical shape plate;

FIG. 4 illustrates the reverse side of the spring material shown in FIG. 3 to illustrate the plated connections on the non-conductive material for creating an electrical coupling to each of the individual plates thereon;

FIG. 5A is an alternate embodiment of one of the expandable plates illustrating the expandable plate in the form of a bellows that has a plurality of individual capacitor plates thereon; and FIG. 5B is a top view of the bellows arrangement illustrated in FIG. 5A showing that the bellows is ovate shaped in cross section.

DETAILED DESCRIPTION OF THE DRAWINGS

Figure 1:
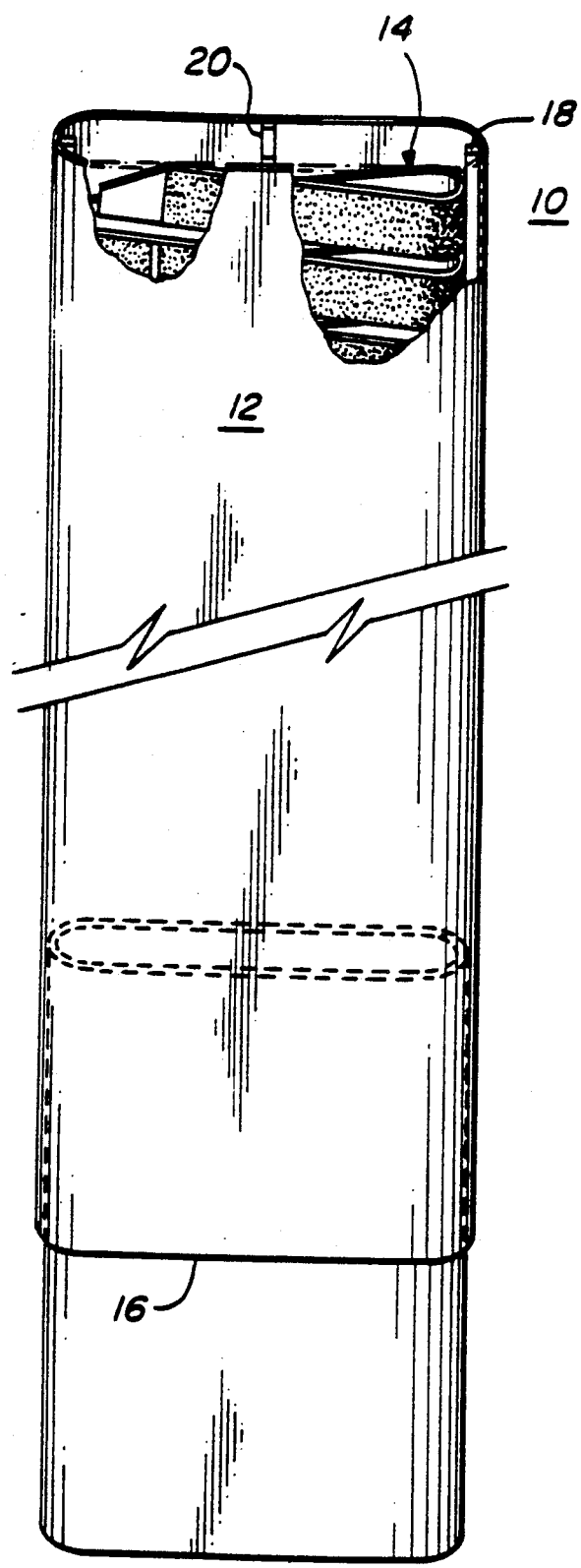
FIG. 1 is an isometric view of the novel capacitor of the present invention.

FIG. 1 is an isometric view of the novel capacitor of the present invention wherein the capacitor is generally designated by the numeral 10 and comprises an outer tubular member 12 and an inner tubular member 14 that is spaced apart from outer tubular member 12 by spacers 18 and 20. The outer tubular number 12 comprises two overlapping portions 14 and 16. The inner surface of the outer tube 12 and the outer surface of the inner tube 14 are plated to form the capacitor. If the inner tube 14 has a construction similar to that of the outer tube 12, and if both tubes 12 and 14 are connected at the top to the top part of the tank and at the bottom to the bottom part of the tank, then capacitor 10 will change lengths with a change in the shape of the tank. It is well known that because of the weight of the fluid that is placed in a container or tank, the container may change shape or thickness. In such case, if the capacitor forming the probe that is determining the quantity or depth of the fluid in the container is of a fixed length, then the measurement relating to the fluid in the tank or container will be inaccurate because the tank changes shape but the condensor probe does not. In order to compensate for the change in shape of the tank the novel capacitor of FIG. 1 is utilized.

Figure 2B:
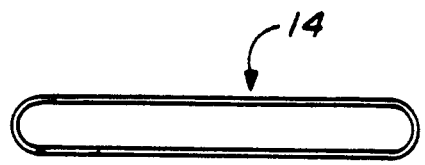
FIG. 2B is a top view of the helical spring illustrated in FIG. 2A showing that the helical spring is ovate shaped in cross section.
Figure 2A:
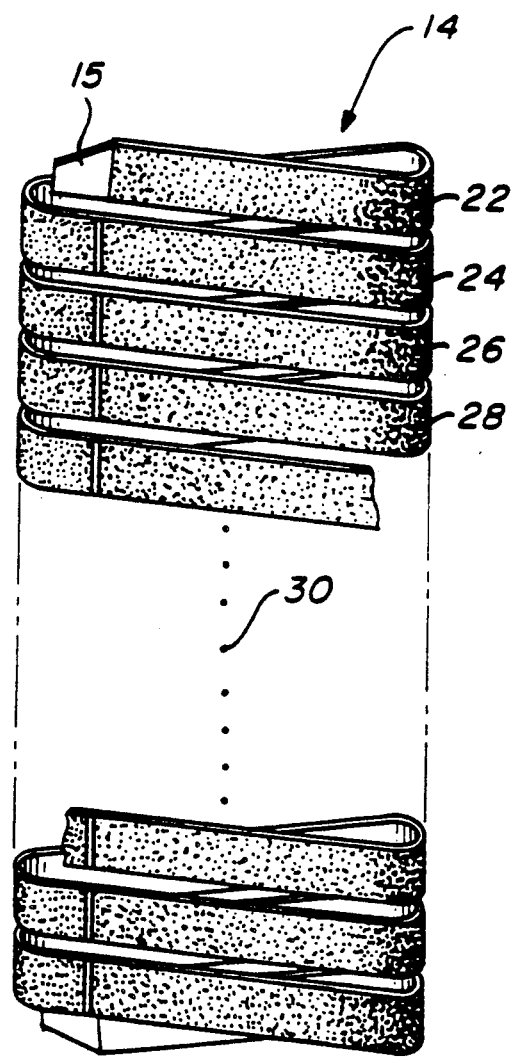
FIG. 2A is a side view of one of the expandable plates illustrating the shape of the plate to be in a helical shape for expansion and contraction.

In the preferred embodiment, the inner tube 14 has the general helical shape indicated in FIG. 2A. In such case, the plate 14 is formed of a non-conductive spring material 15 with conductive material plated thereon in a number of locations to form a plurality of capacitor plates 22, 24, 26, 28, 29 and 30 to provide as many capacitor plates as desired. It will be noted in FIG. 2A that each plate makes at least one 360° revolution and as many as 20 plates or more may be formed in an overall length of approximately 6 inches in the relaxed state. FIG. 2B is a top view of the helical coil in FIG. 2A indicating that it is ovate in cross sectional shape. In practice, the helical spring 14 is inserted in the expandable outer tubular plate 12 illustrated in FIG. 1 and the top end of the outer plate 12 is attached to the top of the tank. The bottom of the outer plate 12 is attached to the bottom of the tank. The helical spring 14 is compressed inside the outer tubular plate 12 and simply expands or contracts with a change in the tank size. Clearly, both plates will flex or change length with a flexation of the tank. In a typical operation, the tank may flex from a depth of 7 inches in the relaxed state to a depth of 11 inches in the extended state. In such case, as stated previously, the inner plate 14 need merely be relaxed state to its smallest length, and inserted in the outer plate 12 and the unit placed in the tank or container. Only the outer plate 12 need be attached to the top and bottom of the tank since the inner plate 14, in the form of the spring, will simply expand and contract to meet the necessary changes in size of the tank. With each of the plates, 22, 24, 26, 28 and the like coupled in the circuit shown and described in commonly assigned co-pending application Ser. No. 519,731 filed May 7, 1990, CAPACITIVE FLUID LEVEL SENSOR, and incorporated herein by reference in its entirety, the capacitive probe illustrated in FIG. 1 will compensate for a change in the size of the tank or container as the tank expands to accommodate the quantity of fluid placed therein. It will be noted with respect to FIGS. 1 and 2A, that the capacitive probe whether extended or relaxed, will always accurately divide the depth of the container into an equal number of divisions thus providing an extremely accurate measurement of the liquid in the tank or container. Thus, with 20 capacitor plates for example only, forming the inner capacitors on helical spring 14 the tank will always be divided into 20 equal parts whether the spring is relaxed or extended. In such case, the quantity or fluid level will always be accurately measured regardless of the amount of expansion or contraction of the tank.

FIG. 3 is a side view of the spring material 15 that is used to form the helical capacitor 14 shown in FIG. 2A. In FIG. 3, the non-conductive spring material 15 is in a flattened state with capacitor plates 22, 24, and so on through the plate designated by the numeral 32 have been plated on the non-conductive spring 15. Each of the plates, for example only, may be 0.300 inches in width, and 4.750 inches in length. There may be a separation distance of 0.075 inches between plates.

On the back sides of the non-conductive spring material 15, as shown in FIG. 4, conductors may be plated from a terminal strip 34 to the various capacitor plates 22, 24 and the like. Thus, as shown in FIG. 4, the first conductor 36 may extend from terminal board 34 to the first capacitor plate 22 where a through hole connects the conductor to the plate 22 on the other side. In like manner, conductor 38 extends to a through hole and connects to capacitor plate 23, conductor 40 extends to a through hole and connects to capacitor plate 24 on the other side and so on until the last conductor 42 extends to a through hole and connects to the last capacitor plate designated by the numeral 32 in FIG. 3. Thus, the terminal strip 34 would include 20 connecting points, each of the connecting points representing a connection to one of the 20 capacitor plates on the reverse side. Again, the number 20 electrical plates has been used for example only and is not intended to be limiting.

The non-conductive spring like material 15 is then rolled to form the helical or spiral shown in FIG. 2A. The material 15 may be a polymer such as that well known in the art by the name Celcon or Delrin. The manner in which the spring like material 15 is rolled into the helical shape is old and well known in the art.

An alternate version of the inner capacitive plate 14 is illustrated in FIG. 5A. Again, the non-conductive material 54 is formed of a bellows for expansion and contraction within the first tubular capacity plate 12 shown in FIG. 1. The bellows comprises the non-conductive spring material 54 having spaced areas of 44, 46, 48, 50 and 52 thereon with conductive material plated on the spaced areas to form a plurality of spaced capacitor plates separated by non-conductive areas 56. Each of the capacitive plates 44, 46, 48, 50 and 52 has a width of substantially 0.300 inches and the length of the bellows when collapsed is approximately 7.00 inches and when expanded to its greatest length, the length is approximately 11.000 inches. The bellows which is shown in FIG. 5A may be either circular in shape if the outer capacitor 12 is circular or ovate in shape as illustrated in FIG. 5B. In FIG. 5B it can be seen that the shortest width of the ovate bellows is 0.300 inches while the longest dimension of the ovate bellows may be substantially 2.240 inches.

Thus, there has been disclosed a novel capacitor for a fluid level sensor that is expandable to change its size with the change in size of the tank or container when fluid is placed therein. Each of the plates is mounted in spaced relationship with respect to the other and placed in the container. The plates are continuously expandable from a first length to a second length with a given change in the shape of the container to compensate for the change in container shape. The capacitance of the expandable plates varies with the fluid level and the air dielectric and generates data representing either volume of the liquid in the container or depth of the liquid as desired.

The novel capacitor is formed of first and second capacitor plates that may have a generally cylindrical tubular shape and are mounted one within the other in spaced relationship. The first and second cylindrical tubular capacitor plates may have a generally ovate shape. The first capacitor plate may be formed of two overlapping sections, one slidable within the other to expand or contract in length. The other plate is formed of a spring material in a helical shape for expansion and contraction within the first capacitor plate. The spring material forming the second capacitor plate is non-conductive and has a plurality of capacitor plates formed thereon in spaced relationship so as to create a plurality of individual capacitors with the first capacitor plate. A plurality of elongated conductors may be formed as a printed circuit on the back side of the spring material, the conductors being equal in number to the plurality of capacitor plates with each conductor being coupled to a respective one of the capacitor plates for applying signals thereto. The strip of spring material is approximately 101.0 inches in length, each capacitor is approximately 4.750 inches in length and 0.500 inches in width with a non-conductive space between the capacitors of approximately 0.075 inches. The spring material is formed from a group of materials comprising Celcon and Delrin.

An alternate embodiment of one of the capacitor plates may be formed in the shape of a bellows, the bellows being made of a non-conductive material having areas plated thereon to form a plurality of capacitor plates. The bellows may again expand in size from approximately 7 inches to 11 inches to accommodate the change in size of a tank or container that has fluid placed therein.

While the invention has been shown and described with respect to a particular embodiment thereof, this is for the purpose of illustration rather than limitation; and other variations and modifications of the specific embodiment herein shown and described will be apparent to those skilled in the art, all within the intended spirit and scope of the invention. Accordingly, the patent is not to be limited in scope and effect to the specific embodiment shown and described nor in any other way that is inconsistent with the extent to which the progress in the art has been advanced by the invention.

What is claimed is:

1. A capacitor for a fluid level sensor comprising:
    first and second elongated expandable capacitor plates mounted in spaced relationship with respect to each other in a container to form a capacitor for measuring data representing the liquid in the container, said capacitor plates being continuously expandable from a first length to a second length with a given change in the shape of the container to compensate for the change in container shape, the capacitance of the expandable plates varying with the fluid and air dielectric and generating the data representing the liquid in the container.

2. A capacitor as in claim 1 where in the first and second capacitor plates have a generally cylindrical tubular shape and are mounted one within the other in spaced relationship.

3. A capacitor as in claim 2 where in the first and second cylindrical tubular capacitor plates have a generally ovate shape in cross section and are mounted one within the other in spaced relationship.

4. A capacitor as in claim 3 wherein the first ovate capacitor plate is formed of two overlapping sections, one slidable within the other to expand or contract in length.

5. A capacitor as in claim 4 wherein the second ovate capacitor plate is formed on a spring material in an ovate helical shape for expansion and contraction within the first ovate capacitor plate.

6. A capacitor as in claim 5 wherein the spring material is non-conductive and the second capacitor plate is deposited on the spring material.

7. A capacitor as in claim 5 wherein the spring material is non-conductive and the second capacitor plate comprises a plurality of capacitor plates formed on one side of the spring material in spaced relationship so as to create a plurality of individual capacitors with the first capacitor plate.

8. A capacitor as in claim 7 further including:
    a plurality of elongated conductors formed as a printed circuit on the other side of the spring material, said conductors being equal in number to the second plurality of capacitor plates; and
    means coupling each conductor to a respective one of the capacitor plates for applying signals thereto.

9. A capacitor as in claim 8 wherein each of the conductors is terminated at one end of the spring material to form an electrical connection.

10. A capacitor as in claim 7 wherein the spring material is approximately 101.0 inches in length; each capacitor is 4.750 inches in length and 0.500 inches in width and each non-conductive space between capacitors is approximately 0.075 inches.

11. A capacitor as in claim 5 wherein the spring material is formed from the group of materials comprising Celcon and Delrin.

12. A capacitor as in claim 2 wherein the first tubular capacitor plate is formed of two overlapping tubular sections, one slidable within the other to expand or contract in length.

13. A capacitor as in claim 12 wherein the second tubular capacitor plate is formed of a bellows for expansion and contraction within the first tubular capacitor plate.

14. A capacitor as in claim 13 wherein the first and second tubular plates are ovate shaped.

15. A capacitor as in claim 14 wherein the bellows comprises:
    a non-conductive spring material ovate shaped in cross section and having spaced areas thereon; and
    conductive material plated on the spaced ovate areas to form a plurality of spaced capacitor plates separated by non-conductive areas.

16. A capacitor as in claim 15 wherein the bellows has a length of 7 inches when collapsed and 11 inches when fully expanded; and wherein the long axis of the ovate cross section has a length of approximately 2.240 inches and the short axis has a width of approximately 0.300 inches.

17. A capacitor as in claim 16 wherein the ovate plated areas are approximately 0.300 inches in width.

18. A capacitor as in claim 17 wherein the non-conductive spring material forming the bellows is formed from the group of materials comprising Celcon and Delrin.

19. A capacitor as in claim 18 wherein the bellows has 20 spaced capacitor plates formed thereon.

20. A capacitor as in claim 1 wherein the first and second plates are expandable from approximately 7 inches in length to 11 inches in length.

21. A capacitor as in claim 1 wherein one end of each of the first and second capacitor plates is attached to the top of the container and the other end of each of the first and second capacitor plates is attached to the bottom of the container such that as the top and bottom of the container move with respect to each other, the length of the first and second capacitor plates changes accordingly.

22. A method of forming a capacitor for a fluid level sensor that measures data that accurately represents the fluid in the container comprising the steps of:
    forming a first capacitor plate expandable in length;
    forming a second capacitor plate expandable in length and in spaced relationship to the first plate to form a variable capacitor;
    associating one end of each capacitor plate to the top the container such that said one end moves with the top of the container; and
    the other end of each capacitor plate with the bottom of the container to form a variable capacitor that compensates for a change in the size of the container when it is filled with fluid.

23. A method as in claim 22 wherein the step of forming the first expandable capacitor plate comprises the steps of:
    forming a first non-conductive tube plated on the inside with a conductive material;
    forming a second non-conductive tube plated on the inside with a conductive material, said second tube being of a size for insertion within said first tube in a concentric sliding relationship to form a first tubular shaped expandable capacitor plate such that the length of said first tubular shaped expandable plate may be changed by slidable movement of the second tube within the first;
    attaching one end of the first tube to the top of the container; and
    attaching the other end of the second tube to the bottom of the container such that a change in the distance between the top and bottom of the container slides the second tube within the first tube to change the length of the first tubular shape expandable capacitor plate.

24. A method as in claim 23 wherein the step of forming the second capacitor plate comprises the steps of:
    forming a length of non-conductive spring material;
    plating a conductive material on one side of the spring material to form at least one capacitor plate;
    plating a printed circuit conductor on the other side of the non-conductive spring material;
    rolling the plated spring material into a tube with the plated conductive material on the outside; and
    attaching the printed circuit conductor to the plated conductive material to form a connection to the second expandable capacitor plate.

25. A method as in claim 24 further including the steps of:
    inserting the second expandable tubular shaped capacitor plate within the first tubular shaped expandable capacitor plate to form a variable capacitor;
    operatively associating one corresponding end of each of the first and second expandable capacitor plates to the top of a container; and
    operatively associating the other corresponding end of each of the first and second expandable capacitor plates to the bottom of the container such that the variable capacitor compensates for a change in the size of the container from a filled to an empty condition.

26. A method as in claim 25 wherein the first and second expandable tubular shaped capacitor plates are generally ovate in shape.

27. A method as in claim 26 wherein the second expandable tubular shaped capacitor plate is rolled in an ovate helical shape for expansion and contraction within said first ovate expandable capacitor plate.

28. A method as in claim 24 wherein the non-conductive spring material is formed from the group of materials comprising Celcon and Delrin.

29. A method as in claim 23 further comprising the step of forming the second tubular plate of a bellows for expansion and contraction within the first tubular capacitor plate.

30. A method as in claim 29 further comprising the step of forming the first and second tubular plates with an ovate shaped cross section.

31. A method as in claim 30 further comprising the step of forming said bellows of a non-conductive spring material having spaced areas thereon that are ovate shaped in cross section; and plating conductive material on the spaced ovate areas to form a plurality of spaced capacitor plates separated by non-conductive areas.

32. A method as in claim 31 further comprising the step of forming the bellows of a length of approximately 7 inches when collapsed and 11 inches when fully expanded, said ovate cross section of said bellows having a long axis length of 2.24 inches and a short axis width of 0.300 inches.

33. A method as in claim 32 further comprising the step of forming the ovate plated areas with a width of approximately 0.300 inches.

34. A method as in claim 33 further comprising the step of forming the non-conductive spring material from the group of materials comprising Celcon and Delrin.

* * * * *